Nov. 13, 1934.  T. A. KEEN  1,980,206
BRAKE
Filed June 2, 1933   2 Sheets-Sheet 1
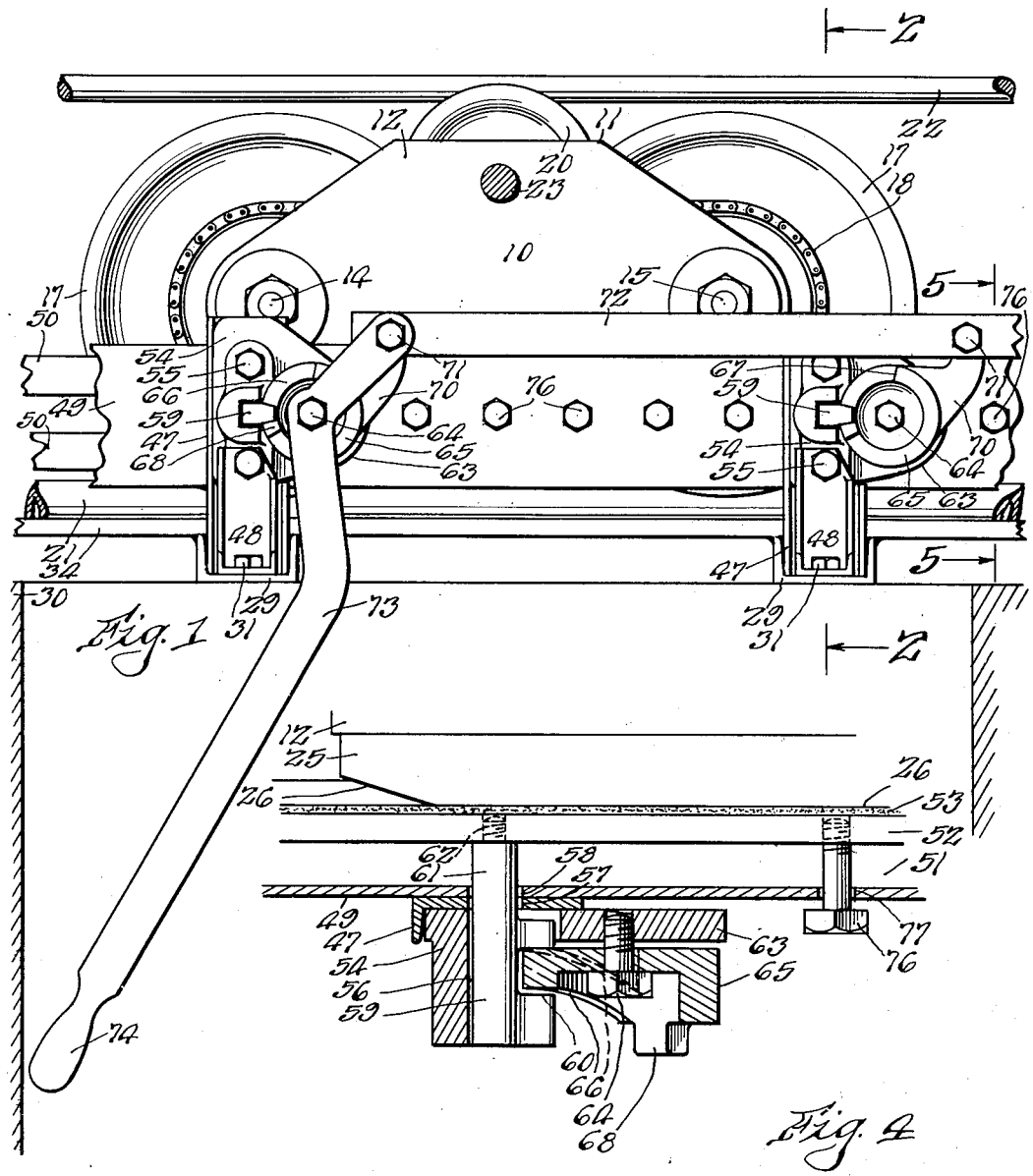
Fig. 1
Fig. 4
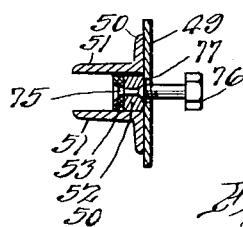
Fig. 5
Inventor:
Thomas A. Keen Nov. 13, 1934.  T. A. KEEN  1,980,206
BRAKE
Filed June 2, 1933   2 Sheets-Sheet 2

Inventor:
Thomas A. Keen

Patented Nov. 13, 1934

1,980,206

UNITED STATES PATENT OFFICE 1,980,206

BRAKE

Thomas A. Keen, St. Louis, Mo., assignor to Hannah M. Smith, River Forest, Ill.

Application June 2, 1933, Serial No. 673,940

3 Claims. (Cl. 188—62)

This invention has to do with a vehicle moving along a predetermined course and relates particularly to a brake that is disposed alongside of such course.

In the art of dog racing, the lure is carried upon a spar, which, in turn, is disposed upon a small car. The car runs upon a track alongside the running lane or dog track. It is customary to employ a self-propelled car, that is, one having a prime mover therein. When an electric motor is employed, the electrical energy is supplied to the motor through the rails of the car track.

Usually the energized rails for directing the course of the lure carrying car will be enclosed by a housing having a longitudinal opening to accommodate the lure carrying spar as it is carried around the course. It is desirable that the housing be of small height so that it will not detract from a full view of the running course.

In the progress of a race, the dogs may make a part lap, a full lap, or even more than one complete lap, depending upon both length of the racing track and the distance to be run. At the finish of a race, the lure carrying car will be brought to a stop. Just previous to the stopping of the car, the energy thereto will be shut off and a curtain will obscure the lure from the dogs.

It is an object of the present invention to provide an improved means for arresting the movement of the lure carrying car at the end of the race after the power to the prime mover thereof has been shut off.

Another object of the present invention is the provision of a new braking means for a dog racing car and which is disposed stationarily alongside of the course followed by the car.

Still another object of the present invention is the provision of a novel form of brake for a car used in a dog racing course and that will not interfere with the movement of the car except when operated for that purpose.

Another object of the present invention is the provision of a brake for a lure carrying car and which is adapted to be placed at any desired part of the racing course.

Another object of the present invention is the provision of an improved brake for dog racing car all of which is disposed and operable below the level of the housing covering the car and track therefor.

Still another object of the present invention is the provision of a stationary brake disposed alongside of the track for a racing car and adapted to be operated in conjunction with a curtain for concealing the lure and by a single attendant.

With the above and other desirable objects in view the improved construction, novel arrangement, and unique combination of the parts comprising the invention are hereinafter described in connection with the accompanying two sheets of drawings hereby made a part of this specification, and in which:

Figure 1 is a fragmentary side view of the invention in combination with a lure carrying car and track therefor;

Figure 4 is a view taken in cross section at the line designated 4—4 in Figure 2; and Figure 5 is a cross sectional view of a part of the present device and taken as indicated at line 5—5 in Figure 1.

The same reference characters will be used in the drawings and throughout the following description for indicating similar parts of the invention.

Figure 2:
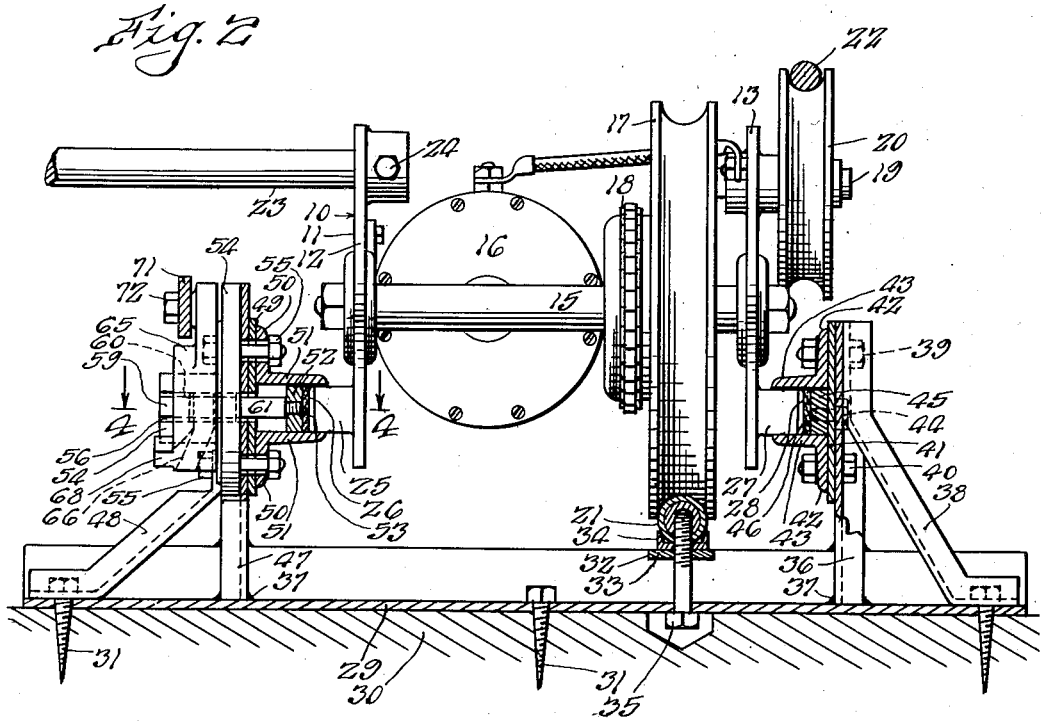
Figure 2 is a cross sectional view of the present device taken at the line 2—2 of Figure 1.

Attention is first directed to Figures 1 and 2 in which there is shown a lure carrying car designated generally by the reference character 10. The car comprises a frame 11 consisting of side plates 12 and 13, which are held in a selected spaced relationship by cross members 14 and 15 at the front and rear of the car respectively. Suitably supported within the frame 11 is an electric motor 16 for driving the car wheels 17. Wheels 17 are journaled upon the frame across members 14 and 15 and are connected together by a chain 18 for common rotation. A stub shaft 19 is anchored in the side piece 13 to serve as a spindle for an idler wheel 20. Both wheels 17 and 20 have a grooved periphery to conform with the rails 21 and 22 with which they are respectively engaged. The two wheels 17 prevent the car from tilting forwardly or backwardly whereas the wheels 17 coact with the idler wheel 20 to prevent the car tilting to either side.

The side plate 12 has a lure carrying spar 23 adjustably secured thereto by means of a set screw 24. Integral with the lower outer side of the side plate 12 is a lug 25 extending horizontally and longitudinally of the car, from front to back and presenting a frictional surface 26. At the same elevation as lug 25 and integral with the lower outer side of the frame member 13 is a similarly shaped lug 27 having a friction surface 28. Lugs 25 and 27 serve as brake shoes for the car.

Electric energy for driving the motor 16 and hence for propelling the car along the rails 21 and 22 is provided through such rails as conductors. The energy may be supplied to the rails at any convenient point. When the energy is disconnected at such a point the car will tend to come to rest at some distant point to which it would be carried by its own momentum. It is the purpose of the present invention to overcome the momentum of the car and thereby stop it within a short distance after the source of electric energy has been disconnected.

The present invention, or the device for braking the movement of the car, rests upon a series of transverse channel members 29. The members 29 may be secured to the track bed 30, which may be of any suitable material such as wood or concrete, by means of screws or bolts 31. The flanges of transverse channel members may be notched at 32 to provide a seat for short strip-like pieces 33 upon which the channel base 34 of the rail 21 may rest. Standard means 35 may be employed for attaching the strips 33, the channel 34 and the rail 21 to the cross members 29. The funicular rail 22 may be suspended in any convenient manner from the ceiling of the track housing (not shown).

Projecting upright from near the right side of the cross member 29 (Figure 2) is a piece 36 having the cross section of a channel. Such member 36 may be fastened in place to the cross member 29 by means of brazing as indicated at 37, or bolts or other standard means may be used for fastening the two members together. Upright member 36 is braced by an angularly arranged channel piece 38 which is toe-nailed at its foot to the cross member 29 by one of the screws 31. A bolt 39 serves to connect the upper end of brace member 38 to the up-right 36. Each of the cross members 29 has an up-right 36 attached thereto and in such a manner that all of the up-rights 36 are alined. Carried commonly upon the inner alined faces of the up-rights 36 and attached thereto by means of the bolts 39 and 40 is a long flat strip 41. To the upper and lower edges of the strip 41 are angle pieces 42 extending in parallelism therewith to present flanges 43 in opposed relationship. The bolts 39 and 40 also serve to attach the channel pieces 42 to the structure. The central body of the strip 41 is provided with apertures at intervals along its length to accommodate short bolts 44. The latter may extend therethrough to engage and hold a narrow strip 45 in position between flanges 43. A layer of friction material 46 is suitably attached to the inner face of the longitudinal strip 45 to be brushed by the brake shoe 27 during certain periods of operation of the device in the manner later to be described.

Figure 3:
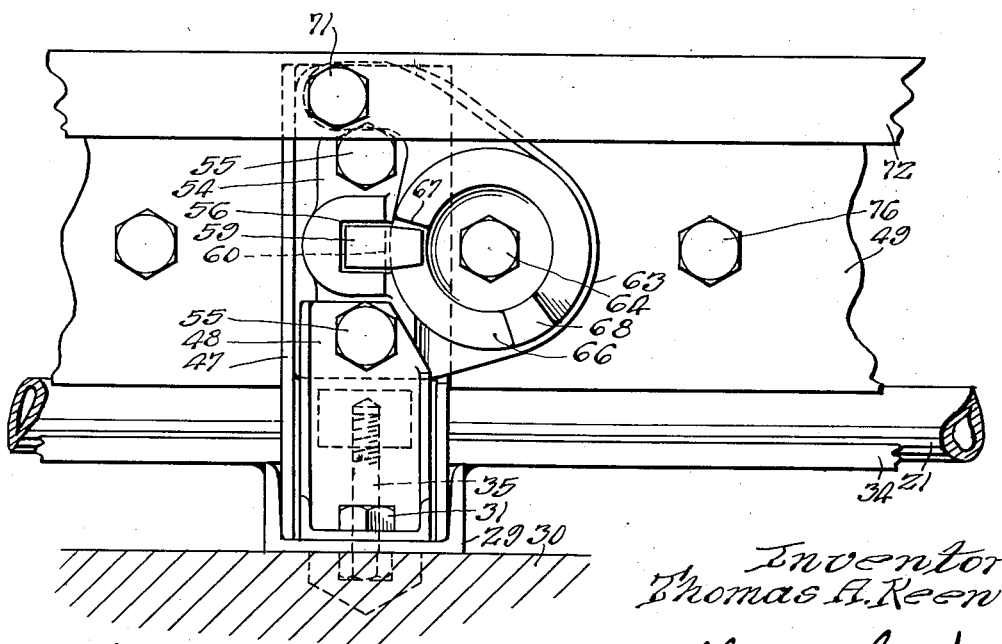
Figure 3 is a fragmentary side elevation of the invention with parts shown in a different position than in Figure 1.

At the ends of the cross members 29 opposite to the up-rights 36 are secured up-right members 47 similar to the up-rights 36. Brace members 48 assist in the maintenance of the up-right position of members 47. To the inner faces of the up-rights 47 is attached a longitudinal strip 49 similar to the strip 41, which is secured to the up-rights 36. At the upper and lower edges of the strip 49 are attached angle pieces 50 to provide a race between the opposed flanges 51 for a slightly flexible strip 52 having a strip of friction material 53 thereon. The friction strips 46 and 53 are normally separated only far enough for the substantially free passage between them of the car bearing the brake shoes, and with only a very slight separation between the shoes and the strips. Bearing brackets 54 are attached to the outer face of each of the up-rights 47 by means of bolts 55, see Figures 1, 3 and 4. The bearings 56 in the brackets 54 are of general rectangular transverse section and register with apertures 57 and 58, which are respectively in the web portion of the channel up-rights 47 and the strip 49. Each bearing 56 reciprocably contains a cam follower 59 having a cam groove 60 in a side thereof, a stem portion 61 for projecting through the apertures 57 and 58 into connection with the strip 52, and a threaded end portion 62 for effecting an anchorage to the strip 52.

Pivotally anchored to the back portion 63 of each of the bearing brackets 54 by means of bolts 64 are circular cam pieces 65. The cam portion of the members 65 is arcuate as indicated at 66 in Figures 1 and 3, the camming sections 66 being terminated at their two ends by steps 67 and lugs 68. Camming sections 66 have two faces as seen in Figure 4. One of the camming faces slides along one side of the notch 60 while the other face slides along the other side of such notch. Each camming member 65 has a short arm 70 extending generally upwardly therefrom, the ends of the arms 70 being apertured to receive bolts 71 which serve as wrist pins providing a pivotal connection to an operating rod 72. The bolt 64 for pivotally holding the cam 65 to the foremost bearing bracket 54 is of greater length than the other bolts 64 so that it may also provide a pivot for an operating lever 73. It will be noted that the end 74 of the operating lever, for being grasped by an attendant, is disposed substantially vertically and beneath the apparatus so that no parts thereof extend above the car and track housing (not shown). The short end of the operating lever pivotally engages the foremost pin 71 whereby the lever is connected to the operating rod 72 for effecting simultaneous movement to the cams 65.

Figure 5 shows a rivet 75 for fastening the friction material 53 to the strip 52. Several of such rivets may be distributed along the length of the strips 52 and 53. The strip 52 is permitted to move inwardly of the device and away from the member 49, however, this movement is limited by the heads of bolts 76, which are anchored to the strip to reach outwardly of the device through apertures 77 in the member 49. Apertures 77 are of a diameter greater than that of the shanks of bolts 76 so that such shanks may be freely reciprocated therein. Inward movement of the strip 52 and the friction member 53 is arrested when heads of the bolts 76 come in contact with the strip 49.

As stated before, the brake mechanism just described may be placed at any convenient or desired place along the length of the car carrying rails 21 and 22; usually the mechanism will be placed at a point just beyond the spectator's stand. The device is not limited to any particular length. In its present form, however, it has a length of about sixteen feet, there being eight pair of up-rights 36 and 47 with a two foot space between each pair. A pit may be provided beneath the running alley where an operator or attendant may be stationed to manipulate both the lever 73 (or a gang of such levers 73) and other apparatus for dropping the heretofore mentioned curtain behind the lure at the finish of the race.

The operation of the device is as follows. When it is desired to arrange the apparatus so that it will be ineffective and in no way interfere with the passage of the racing car, the lever 73 will be turned to the position shown in Figure 1. That is, the lever 73 will be turned to its most clockwise position to thrust operating rod 72 backwardly and to rotate the cams 65 in a clockwise direction until the lugs 68 are abutted against the edges of their respective grooves 60. When the cams 65 are rotated to this position, the cam followers 59 will be drawn outwardly of the device to place the strip 52 contiguous to side strip 49. When the apparatus is thus arranged the space between the friction strips 46 and 53 will be such as to permit free passage of the brake shoes 25 and 27 therebetween.

At the finish of a race, the operator will throw an electric switch whereby the power supply to the rails 21 and 22 and hence to the motor 16 is shut off so that the car will be carried forward only by its own momentum. The mechanism for dropping the curtain to the rear of the lure is operated after the car has passed the curtain supports. The brake mechanism may have been set to stop the car since it last passed by the brake section. Setting of the brake mechanism to stop the car is accomplished by pivoting the lever anti-clockwise, Figure 1, to rotate the cams 65 in a like direction until the steps 67 are carried adjacently to the notches 60 of the cam followers. Such movement of the cams 65 presses the cam followers 59 and the friction member 53 toward friction member 46. Each cam 65 may be designed slightly differently than the others so that each will effect a different displacement of the section of the base 52 of the friction strip 53 to which it is attached. The longitudinal base member 52 may be securely fastened to the side piece 49 at the back end of the device, that is, the end at which the car enters the device. Only a slight incline will then be given to the camming surfaces 66 of the backmost cam 65 and the incline given to the camming surfaces of the individual cams as the front of the device is approached will be increased in graduated fashion. Thus when the lever 73 is pivoted in a counter-clockwise direction, the back end of the friction member will not be displaced whereby the car may unobstructedly enter the device. As the front of the device is approached, the friction member 53 will be displaced inwardly more and more to converge upon the friction member 46 opposite thereto until the space between the two members is insufficient to provide passage of the car. Before the brake shoes 25 and 27 of the car will become tightly lodged between the longitudinal friction members 46 and 53 they will come into frictional contact with such friction members so as to be actually retarded by an increasingly applied frictional resistance rather than an abrupt stop. Bolts 76, which are reciprocably disposed in aperture 77 are arranged with their heads at graduated distances from the longitudinal base member 52 so as to adapt the friction member 53 to the angular displacement just described.

A setting of the brake mechanism in a position for stopping the car may be had at any time while the car is approaching, or when the car is to make more than one lap about the track, the brake mechanism may be set immediately after the car has passed for completing the last lap. Such a pre-setting of the brake mechanism provides that the car will be automatically stopped without further attention by the attendant, so far as the brake mechanism is concerned, at the time the race is finished. After the brake has been thus pre-set, the operator may confine his attention to the opening of the switch for interrupting the power to the car motor and to the dropping of the curtain for concealing the lure. In this manner, the device well lends itself for use upon a racing track having but a single track attendant.

What is claimed as new and is desired to be secured by Letters Patent of the United States is:

1. In combination with a lure carrying device comprising a car, a supporting structure, upper and lower rails, a brake structure comprising longitudinally and outwardly disposed brake shoes at each side of said car, channel members on said supporting structure and into which said brake shoes fit, brake strips within said channel members, friction strips on the exposed faces of said brake strips, and means comprising differentially shaped cams, cam followers and coupling rods at a plurality of positions along said channel members to displace said brake and friction strips differentially therealong towards said brake shoes.

2. Track, car and brake structure comprising upper and lower rounded rails offset one from another, a car frame, wheels on said frame registering with said tracks and having flanges extending approximately one hundred eighty degrees thereabout, channel members at the sides of said tracks and having their open sides faced inwardly and arranged in parallelism and occupying the same horizontal plane, brake strips faced with resilient friction material between the flanges of said channel members, brake shoes of a cross section substantially corresponding with the interior of said channel members and mounted at opposite sides of said car, and means for moving one of said brake strips from a position of parallelism with the other channel member to a position of slight inward convergence for arresting movement of said car.

3. In a lure carrying device, track, car and brake structure comprising supporting members, upper and lower rounded rails offset one from another and mounted on said supporting members, a car comprising a frame, a prime mover, power transmission means, and wheels registering with said rails and having flanges extending partially about said rails on both sides thereof, a brake structure comprising longitudinal outwardly extending brake shoes at each side of said car and disposed upon the frame thereof, channel members having channels corresponding to said brake shoes and mounted upon said supporting members and parallel to, in registry with, and partially about said brake shoes, longitudinal brake strips faced with friction strips on the exposed face thereof within the channels in said channel members, said friction strips being normally held adjacent to said brake shoes without causing pronounced retardation of said car, one of said brake strips being movable toward said brake shoes, a plurality of double acting cams at spaced intervals along said channel member, said cams having extending arms and being progressively more deeply formed from one end of said channel member to the other, reciprocating cam followers and connecting links attached to said brake strips and cooperating with said cams, a rod connecting the arms on said cams for the parallel movement thereof, and handle means for moving said rod lengthwise thereof, the movement of said arms causing said brake strip and friction strip to be forced toward said brake shoes more extensively at one end of said channel members than at the other end thereof.

THOMAS A. KEEN.